United States Patent
Ma et al.

(10) Patent No.: US 10,172,159 B2
(45) Date of Patent: Jan. 1, 2019

(54) DATA TRANSMISSION METHOD AND DEVICE

(71) Applicant: Huawei Technologies Co., Ltd., Shenzhen (CN)

(72) Inventors: Chixiang Ma, Shanghai (CN); Tianyu Wu, Shenzhen (CN); Jiayin Zhang, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 82 days.

(21) Appl. No.: 15/191,307

(22) Filed: Jun. 23, 2016

(65) Prior Publication Data
US 2016/0309513 A1    Oct. 20, 2016

Related U.S. Application Data

(63) Continuation of application No. PCT/CN2013/090323, filed on Dec. 24, 2013.

(51) Int. Cl.
*H04W 74/08* (2009.01)
*H04W 72/12* (2009.01)
(Continued)

(52) U.S. Cl.
CPC ... *H04W 74/0816* (2013.01); *H04W 72/1252* (2013.01); *H04W 72/0446* (2013.01); *H04W 84/12* (2013.01)

(58) Field of Classification Search
CPC ..... H04W 84/12; H04W 72/14; H04W 12/08; H04W 72/0816; H04W 72/1252; H04W 72/0446
(Continued)

(56) References Cited

U.S. PATENT DOCUMENTS 7,085,256 B2   8/2006   Ware et al.
8,305,948 B2   11/2012  Surineni et al.
(Continued)

FOREIGN PATENT DOCUMENTS

CN   102386954 A   3/2012
CN   103096440 A   5/2013
(Continued)

OTHER PUBLICATIONS

IEEE Standards Association, Part 11: Wireless LAN Medium Access Control (MAC) and Physical Layer (PHY) Specifications, IEEE Computer Society, IEEE Std 802.11™-2012, Mar. 29, 2012, 2793 pages, New York.

*Primary Examiner* — Phong La
(74) *Attorney, Agent, or Firm* — Slater Matsil, LLP

(57) ABSTRACT

The present disclosure provides a data transmission method and device. The method includes sensing, by a station, whether a channel allocated by an access point associated with the station is occupied, before obtaining a downlink scheduling phase. If the channel is not occupied, sending, by the station, channel clear signaling to the access point, where the channel clear signaling includes a first identifier used for identifying the station and a second identifier used for identifying the access point. The method also includes receiving, by the station in the downlink scheduling phase, data transmitted by the access point. The present disclosure ensures normal data transmission.

15 Claims, 10 Drawing Sheets

(51) Int. Cl.
*H04W 84/12* (2009.01)
*H04W 72/04* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 8,837,435 | B2* | 9/2014 | Singh | H04W 74/0816 |
| | | | | 370/335 |
| 9,521,682 | B2* | 12/2016 | Kim | H04W 76/023 |
| 2006/0221999 | A1 | 10/2006 | Bachrach et al. | |
| 2007/0058605 | A1* | 3/2007 | Meylan | H04W 72/0406 |
| | | | | 370/346 |
| 2008/0107156 | A1* | 5/2008 | Wentick | H04B 1/713 |
| | | | | 375/134 |
| 2009/0109938 | A1* | 4/2009 | Singh | H04W 74/0816 |
| | | | | 370/337 |
| 2010/0061358 | A1* | 3/2010 | Takano | H04L 1/1671 |
| | | | | 370/338 |
| 2011/0090855 | A1* | 4/2011 | Kim | H04B 7/0452 |
| | | | | 370/329 |
| 2011/0176627 | A1* | 7/2011 | Wu | H04B 7/0452 |
| | | | | 375/260 |
| 2012/0287849 | A1* | 11/2012 | Wilczewski | H04W 74/085 |
| | | | | 370/328 |
| 2013/0051256 | A1 | 2/2013 | Ong et al. | |
| 2013/0229996 | A1* | 9/2013 | Wang | H04W 72/0413 |
| | | | | 370/329 |
| 2015/0055541 | A1* | 2/2015 | Zhang | H04W 72/005 |
| | | | | 370/312 |
| 2015/0085797 | A1* | 3/2015 | Ji | H04J 3/16 |
| | | | | 370/329 |
| 2015/0131517 | A1* | 5/2015 | Chu | H04L 5/0007 |
| | | | | 370/312 |
| 2015/0173088 | A1* | 6/2015 | Kim | H04W 76/023 |
| | | | | 370/329 |
| 2016/0255625 | A1* | 9/2016 | Kim | H04W 74/04 |
| | | | | 370/336 |
| 2016/0295612 | A1 | 10/2016 | Li et al. | |
| 2016/0309492 | A1 | 10/2016 | Ma et al. | |

FOREIGN PATENT DOCUMENTS

CN 103298135 A 9/2013
EP 1693992 A1 8/2006

* cited by examiner

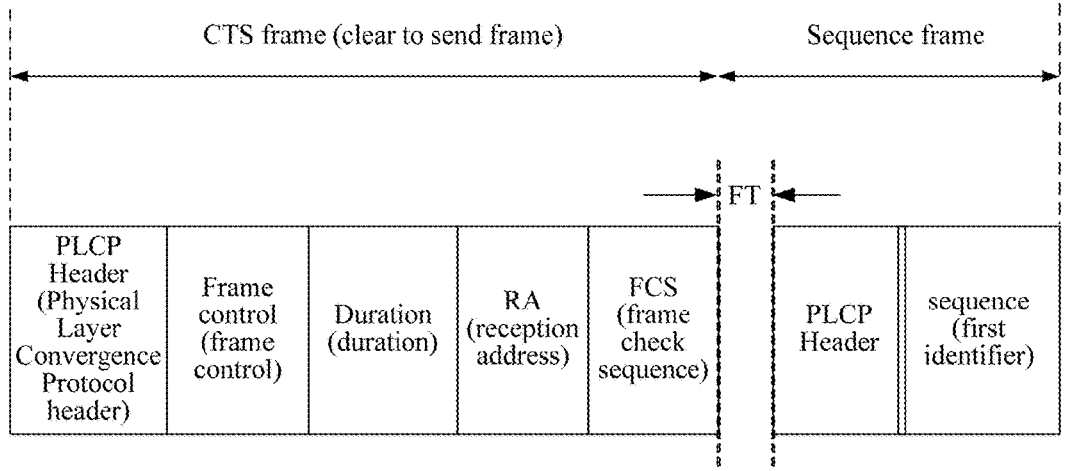

FIG. 3

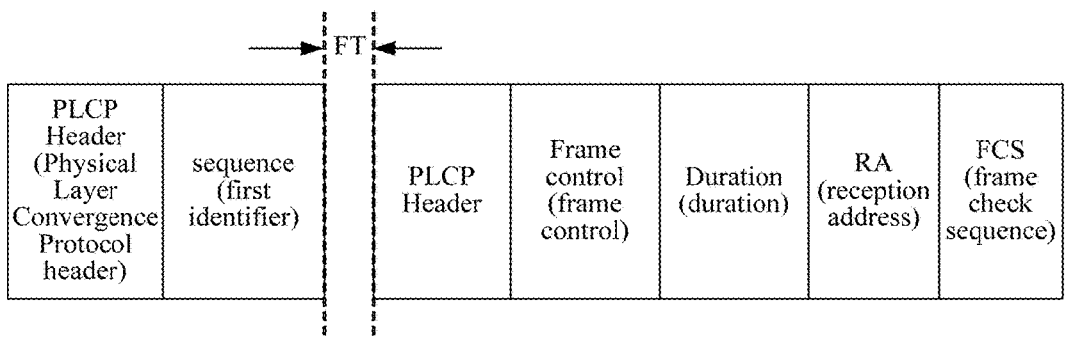

FIG. 4

An access point receives channel clear signaling sent by station, where the channel clear signaling includes a first identifier used for identifying the station and a second identifier used for indicating the access point — 501

When determining that the second identifier is an identifier corresponding to the access point, the access point transmits, by using a downlink scheduling phase, data to the station corresponding to the first identifier — 502

FIG. 5

DATA TRANSMISSION METHOD AND DEVICE

CROSS-REFERENCE TO RELATED APPLICATIONS

This application is a continuation of International Patent Application No. PCT/CN2013/090323, filed on Dec. 24, 2013, which is hereby incorporated by reference in its entirety.

TECHNICAL FIELD

The present disclosure relates to communications technologies, and in particular embodiments, to a data transmission method and device.

BACKGROUND

In order to adapt to the increasing data transmission demands and relieve the load of a wireless network, an existing upgrading technology is to increase spectrum resources, so as to transmit more information. For a spectrum that is strictly controlled by a spectrum management organization, spectrums that are obtained by purchasing a license are difficult to be continuously distributed, and a data transmission peak rate needs to be improved by using a spectrum resource fragment technology. A wireless device can use a free spectrum as long as the wireless device meets a power limit. Generally, a particular signal to noise ratio is required in data transmission in wireless communications, and the free spectrum may be used by some devices at any time. Therefore, when the free spectrum is used for communication, a data transmission peak rate also needs to be improved by using the spectrum resource fragment technology.

As data communications rapidly develops, the 802.11 standard is applied to more scenarios and has a broader market. Because network resources used for data transmission are limited, and the 802.11 standard is based on a carrier sense multiple access/collision detect (CSMA/CA for short) mechanism, a quality of service (QoS for short) problem occurs as long as network resource contention exists. First, because of an increase of a data transmission amount and detailed data service classification, higher requirements are put forward on transmission resource allocation, a transmission delay, a data packet loss rate, and a delay variation. Second, because total transmission resources are limited, if a type of service occupies more transmission resources to transmit data, fewer transmission resources can be used by another service to transmit data. Therefore, higher requirements are also put forward on planning and allocation of transmission resources of various services in an 802.11 network. A scheduling transmission manner can exactly well resolve the QoS problem, and needs to be compatible with a legacy wireless local area network system. Therefore, a scheduling transmission solution needs to be provided in a contention transmission system.

In an 802.11 system, the following hidden node problem and exposed node problem exist. The hidden node problem refers to that when a first access point (AP for short) 1 transmits data to station (STA for short), an AP2 does not know about this and also starts to transmit data to the STA. As a result, the STA cannot receive the data of the AP1 correctly. The exposed node problem refers to that when a STA1 transmits data to an AP1, a STA2 senses a network allocation vector (NAV for short) that is set when the STA1 sends the data, so the STA2 cannot transmit data to an AP2; however, data sending by the STA2 does not affect receiving by the AP1 in this case, and consequently, system resource usage is reduced. These problems all lead to that contention transmission cannot be normally performed.

SUMMARY

The present disclosure provides a data transmission method and device, so as to ensure normal data transmission.

With reference to a first aspect, a data transmission method is provided, where the method includes the following. Before obtaining a downlink scheduling phase, sensing, by a station, whether a channel allocated by an access point associated with the station is occupied. In response to the channel not being occupied, sending, by the station, channel clear signaling to the access point, where the channel clear signaling includes a first identifier used for identifying the station and a second identifier used for identifying the access point, so that after determining that the second identifier is an identifier corresponding to the access point, the access point obtains the downlink scheduling phase used for data transmission. The method also includes receiving, by the station in the downlink scheduling phase, data transmitted by the access point.

With reference to the first aspect, in an implementation, the method further includes receiving, by the station, downlink scheduling information, and indication information used for identifying a sequence of the station, where the downlink scheduling information and the indication information are sent by the access point. This implementation further includes determining, according to the downlink scheduling information, that the station is scheduled by the access point to perform downlink transmission, where the first identifier includes the sequence of the station that is acquired by the station according to the indication information. Such a step may occur before the step of sensing whether a channel allocated by an access point associated with the station is occupied.

With reference to the first aspect, in an implementation, the indication information of the sequence of the station is received by the station in a process in which the station is associated with the access point, and the sequence of the station is a sequence allocated by the access point and corresponding to the station.

With reference to the first aspect, in an implementation, the indication information of the sequence of the station is a sequence indication update message that is received from the access point by the station after the station is associated with the access point, where the sequence indication update message includes the indication information of the sequence of the station.

With reference to the first aspect, in an implementation, the channel clear signaling includes a clear to send frame and a sequence frame, where the clear to send frame includes the second identifier and a network allocation vector, and the sequence frame includes the first identifier.

With reference to a second aspect, a data transmission method is provided, where the method includes the following. Receiving, by an access point, channel clear signaling sent by station, where the channel clear signaling includes a first identifier used for identifying the station and a second identifier used for indicating the access point, and the channel clear signaling is sent by the station when the station senses that a channel allocated by the access point associated with the station is not occupied. The method also includes transmitting, by the access point by using a downlink scheduling phase, data to the station corresponding to the first identifier, in response to determining that the second identifier is an identifier corresponding to the access point.

With reference to the second aspect, in an implementation, the method further includes sending, by the access point, downlink scheduling information, and indication information used for identifying a sequence of the station to the station, so that the station adds, to the channel clear signaling according to the indication information, the sequence of the station corresponding to the indication information, as the first identifier. This step may occur before the step of receiving, by an access point, channel clear signaling sent by station.

With reference to the second aspect, in an implementation, the access point contends to send the downlink scheduling information in a downlink period; or the access point sends the downlink scheduling information after a downlink scheduling phase in a downlink period; or the access point sends the downlink scheduling information after sending the channel clear signaling to the station in a downlink period.

With reference to a third aspect, a data transmission method is provided, where the method the following. Sensing, by an access point, whether a channel allocated by the access point to associated station is occupied, before obtaining an uplink scheduling phase. In response to the channel not being occupied, sending, by the access point, channel clear signaling to the station, where the channel clear signaling includes a third identifier used for identifying the access point and a fourth identifier used for identifying a network in which the station is located, so that when determining that a network corresponding to the fourth identifier is the network in which the station is located, and an access point corresponding to the third identifier is the access point associated with the station, the station obtains the uplink scheduling phase used for data transmission. The method also includes receiving, by the access point in the uplink scheduling phase, data transmitted by the station.

With reference to the third aspect, in an implementation, the method further includes sending, by the access point, uplink scheduling information to the station, where the uplink scheduling information is used for scheduling the station to perform uplink transmission. The sending, by the access point, channel clear signaling to the station includes sending, by the access point, the channel clear signaling to the station, and adding, to the channel clear signaling, an access point sequence used for identifying the access point, as the third identifier. These steps may occur before or after the sending, by the access point, channel clear signaling to the station.

With reference to the third aspect, in an implementation, the access point contends to send the uplink scheduling information in a downlink period; or the access point sends the uplink scheduling information after a downlink scheduling phase in a downlink period; or the access point sends the uplink scheduling information after sending the channel clear signaling to the station in a downlink period.

With reference to the third aspect, in an implementation, the channel clear signaling includes a clear to send frame and a sequence frame, where the clear to send frame includes the third identifier and a network allocation vector, and the sequence frame includes the fourth identifier.

With reference to a fourth aspect, a data transmission method is provided, where the method includes the following. Receiving, by a station, channel clear signaling sent by an access point, where the channel clear signaling includes a third identifier used for identifying the access point and a fourth identifier used for identifying a network in which the station is located, and the channel clear signaling is sent by the access point when the access point senses that a channel allocated by the access point to the associated station is not occupied. In response to determining that a network corresponding to the fourth identifier is the network in which the station is located, and an access point corresponding to the third identifier is the access point associated with the station, obtaining, by the station, an uplink scheduling phase, and transmitting, by using the uplink scheduling phase, data to the access point corresponding to the third identifier.

With reference to the fourth aspect, in an implementation, the third identifier is indication information of a sequence of the access point. In such an implementation, the method further includes receiving, by the station in a process in which the station is associated with the access point, the indication information of the sequence of the access point that is sent by the access point. This step may occur before the step of receiving, by station, channel clear signaling sent by an access point.

With reference to the fourth aspect, in an implementation, the third identifier is indication information of a sequence of the access point. In such an implementation, the method further includes receiving, by the station after the station is associated with the access point, a sequence indication update message sent by the access point, where the sequence indication update message includes the indication information of the sequence of the access point. This step may occur before the step of receiving, by station, channel clear signaling sent by an access point.

With reference to the fourth aspect, in an implementation, the method further includes receiving, by the station, uplink scheduling information sent by the access point, and determining, according to the uplink scheduling information, that the station is scheduled by the access point to perform uplink transmission. This step may occur before or after the step of receiving, by station, channel clear signaling sent by an access point.

With reference to the fourth aspect, in an implementation, the station broadcasts the uplink scheduling information to another station after an uplink/downlink switching point in an uplink period.

With reference to a fifth aspect, a station is provided, where the station includes a processor and a computer-readable storage medium storing a program to be executed by the processor. The program includes a plurality of program modules including the following. A first channel sensing module, configured to, before a downlink scheduling phase is obtained, sense whether a channel allocated by an access point associated with the station is occupied. A first signaling sending module, configured to send channel clear signaling to the access point, in response to the channel not being occupied, where the channel clear signaling includes a first identifier used for identifying the station and a second identifier used for identifying the access point, so that after determining that the second identifier is an identifier corresponding to the access point, and the access point obtains the downlink scheduling phase used for data transmission. A first data receiving module configured to receive, in the downlink scheduling phase, data transmitted by the access point.

With reference to the fifth aspect, in an implementation, an information acquiring module is configured to, before the first channel sensing module senses whether the channel is occupied, receive downlink scheduling information, and indication information used for identifying a sequence of the station, where the downlink scheduling information and the indication information are sent by the access point. The information acquiring module may be further configured to determine, according to the downlink scheduling information, that the station is scheduled by the access point to perform downlink transmission. The first signaling sending module is configured to send the channel clear signaling to the access point, in response to sending the channel clear signaling, and add, according to the indication information, the sequence of the station that is acquired according to the indication information, as the first identifier.

With reference to the fifth aspect, in an implementation, the information acquiring module is configured to, in response to receiving the indication information, receive, in a process in which the station is associated with the access point, the sequence of the station, where the sequence of the station is a sequence allocated by the access point and corresponding to the station; or, receive, after the station is associated with the access point, a sequence indication update message sent by the access point, where the sequence indication update message includes the indication information of the sequence of the station.

With reference to a sixth aspect, an access point is provided, where the access point includes a processor and a computer-readable storage medium storing a program to be executed by the processor. The program includes a plurality of program modules including the following. A first signaling receiving module configured to receive channel clear signaling sent by station, where the channel clear signaling includes a first identifier used for identifying the station and a second identifier used for indicating the access point, and the channel clear signaling is sent by the station when the station senses that a channel allocated by the access point associated with the station is not occupied. A first data sending module configured to transmit, by using a downlink scheduling phase, data to the station corresponding to the first identifier, in response to a determination that the second identifier is an identifier corresponding to the access point.

With reference to the sixth aspect, in an implementation, the plurality of program modules further includes a scheduling control module configured to, before the first signaling receiving module receives the channel clear signaling sent by the station, send downlink scheduling information, and indication information used for identifying a sequence of the station to the station, so that the station adds, to the channel clear signaling according to the indication information, the sequence of the station corresponding to the indication information, as the first identifier.

With reference to the sixth aspect, in an implementation, the scheduling control module is configured to, in response to sending the downlink scheduling information to the station, contend to send the downlink scheduling information in a downlink period; or, send the downlink scheduling information after a downlink scheduling phase in a downlink period; or, send the downlink scheduling information after the channel clear signaling is sent to the station in a downlink period.

With reference to a seventh aspect, an access point is provided, where the access point includes a processor and a computer-readable storage medium storing a program to be executed by the processor. The program includes a plurality of program modules including the following. A second channel sensing module configured to, before an uplink scheduling phase is obtained, sense whether a channel allocated by the access point to associated station is occupied. A second signaling sending module configured to, in response to the channel not being occupied, send channel clear signaling to the station, where the channel clear signaling includes a third identifier used for identifying the access point and a fourth identifier used for identifying a network in which the station is located, so that when determining that a network corresponding to the fourth identifier is the network in which the station is located, and an access point corresponding to the third identifier is the access point associated with the station, the station obtains the uplink scheduling phase used for data transmission. A second data receiving module configured to receive, in the uplink scheduling phase, data transmitted by the station.

With reference to the seventh aspect, in an implementation, the plurality of program modules further includes an information sending module configured to send uplink scheduling information to the station, where the uplink scheduling information is used for scheduling the station to perform uplink transmission. This step may occur before or after the second signaling sending module sends the channel clear signaling. The second signaling sending module is configured to, in response to sending the channel clear signaling to the station, add, to the channel clear signaling, an access point sequence used for identifying the access point, as the third identifier.

With reference to the seventh aspect, in an implementation, the information sending module is configured to, in response to sending the uplink scheduling information to the station, contend to send the uplink scheduling information in a downlink period; or, send the uplink scheduling information after a downlink scheduling phase in a downlink period; or send the uplink scheduling information after the channel clear signaling is sent to the station in a downlink period.

With reference to an eighth aspect, station is provided, where the station includes a processor and a computer-readable storage medium storing a program to be executed by the processor. The program includes a plurality of program modules including the following. A second signaling receiving module configured to receive channel clear signaling sent by an access point, where the channel clear signaling includes a third identifier used for identifying the access point and a fourth identifier used for identifying a network in which the station is located, and the channel clear signaling is sent by the access point when the access point senses that a channel allocated by the access point to the associated station is not occupied. A second data sending module, configured to, in response to a determination that a network corresponding to the fourth identifier is the network in which the station is located, and an access point corresponding to the third identifier is the access point associated with the station, obtain an uplink scheduling phase, and transmit, by using the uplink scheduling phase, data to the access point corresponding to the third identifier.

With reference to the eighth aspect, in an implementation, the second signaling receiving module is further configured to receive uplink scheduling information sent by the access point, and determine, according to the uplink scheduling information, that the station is scheduled by the access point to perform uplink transmission. This step may occur before or after the station receives the channel clear signaling sent by the access point.

With reference to the eighth aspect, in an implementation, the second signaling receiving module is configured to, in response to receiving the uplink scheduling information sent by the access point, receive, in a process in which the station is associated with the access point, indication information of a sequence of the access point that is sent by the access point; or, receive, after the station is associated with the access point, a sequence indication update message sent by the access point, where the sequence indication update message includes indication information of a sequence of the access point.

With reference to the eighth aspect, in an implementation, the second data sending module is further configured to broadcast the uplink scheduling information received by the second signaling receiving module to another station after an uplink/downlink switching point in an uplink period.

In the forgoing solutions, a receive end device for data transmission senses a local channel of the receive end device before performing transmission, and sends, only when the local channel of the receive end device is available, channel clear signaling to instruct a transmit end device to start data transmission, so that a transmission collision can be avoided. For example, for a hidden node problem, a STA does not send channel clear signaling to an AP2 because a local channel of the STA is occupied, thereby preventing the AP2 from transmitting data to the STA; for an exposed node problem, only an AP1 that serves as a receive end device sends channel clear signaling to instruct a STA1 to transmit data, and the transmit end STA1 does not send an existing NAV, thereby preventing interference to data transmission of a STA2. Therefore, the solutions in embodiments of the present disclosure ensure normal data transmission.

BRIEF DESCRIPTION OF THE DRAWINGS

FIG. 3 is a structural diagram of Channel Clear Signaling (CCS for short) in an embodiment of a data transmission method according to the present disclosure;

FIG. 4 is another structural diagram of CCS in an embodiment of a data transmission method according to the present disclosure;

FIG. 5 is a schematic flowchart of another embodiment of a data transmission method according to the present disclosure;

DETAILED DESCRIPTION OF ILLUSTRATIVE EMBODIMENTS

In embodiments of the present disclosure, a frequency band resource of a communications system is divided into several component carriers (CC for short), and bandwidths of all component carriers are changeable.

Carrier aggregation is to aggregate two or more component carriers. In a carrier aggregation manner in a wireless local area network, a contention-scheduling hybrid mode may be used, a transmission time of each component carrier is divided into a scheduling phase and a contention phase, the contention phase is used for contending to obtain data transmission, and in the scheduling phase, the data transmission that is obtained through contention is scheduled. It may be understood that, data transmission on each component carrier is also based on contention, for example, CSMA/CA in the prior art is used. Contention is performed by using a CSMA/CA mechanism, that is, an opportunity to send data is obtained through contention. A scheduling phase (SP for short) may be a phase, on a component carrier, for performing uplink or downlink transmission that is obtained through contention. A contention phase (CP for short) may be a phase except the scheduling phase on the component carrier. Certainly, the scheduling phase and the contention phase may also have other names, and also fall within the protection scope of the present disclosure.

An embodiment of the present disclosure provides a data transmission method, where the method is used to resolve a hidden node problem and an exposed node problem that currently exist, so that data is not interfered during transmission of the data, and normal data transmission is ensured. The method may be used for data transmission in a wireless local area network, for example, used for 10GiFi, and the data transmission method in this embodiment may be used in a scenario in which a scheduling phase is acquired through contention. That is, a scheduling transmission method may include a scheduling transmission manner and a contention transmission manner, where a specific transmission method of the contention transmission manner may be implemented based on an existing CSMA/CA contention mechanism, so as to be compatible with the prior art.

Figure 1:
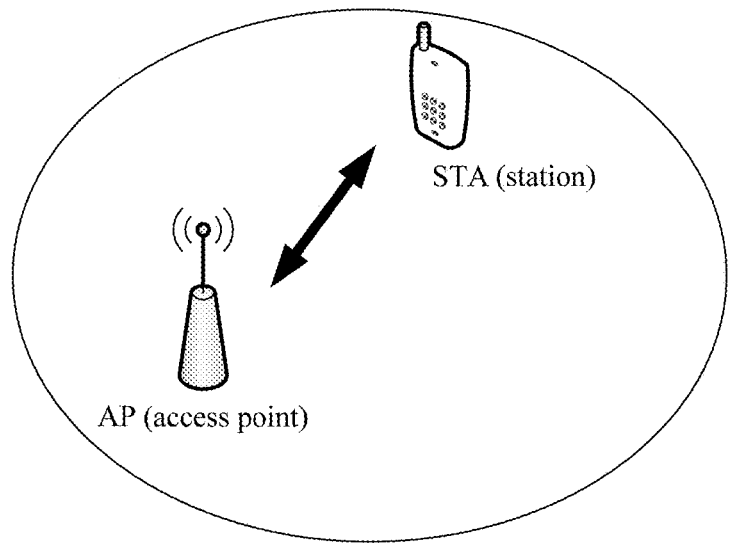
FIG. 1 shows an optional applicable scenario of an embodiment of a data transmission method according to the present disclosure.

FIG. 1 shows an optional applicable scenario of an embodiment of a data transmission method according to the present disclosure. As shown in FIG. 1, data transmission method in this embodiment of the present disclosure may be used for data transmission between station (STA) and an access point (AP), where the data transmission may be that the AP transmits downlink data to the STA, and during downlink data transmission, the AP serves as a transmit end device of the current data transmission, and the STA serves as a receive end device; or, may be that the STA transmits uplink data to the AP, and during uplink data transmission, the STA serves as a transmit end device of the current data transmission, and the AP serves as a receive end device. In addition, in this embodiment of the present disclosure, the downlink data needs to be sent by using an obtained downlink scheduling phase, and the uplink data needs to be sent by using an obtained uplink scheduling phase. That is, the method in this embodiment of the present disclosure may be used by the transmit end device to transmit data to the receive end device by using the scheduling phase.

For ease of understanding a scheduling phase, an uplink phase, and a downlink phase, a brief description is provided as follows.

Generally, based on time, each component carrier is divided into an uplink time of the component carrier and a downlink time of the component carrier by using an uplink/downlink switching point, where uplink/downlink switching points of different component carriers are consistent in time, that is, uplink/downlink switching points of all the component carriers are aligned in terms of time. For example, a network side device may determine an uplink/downlink switching point, and broadcast the uplink/downlink switching point to each station periodically in the uplink time and/or the downlink time of each component carrier.

An uplink time and a downlink time of a component carrier have a same time length, that is, time lengths between every two neighboring uplink/downlink switching points are the same. A specific value of the time length may be set autonomously, and the value may be updated and changed in actual application, which is not limited herein. However, an uplink time and a downlink time of a component carrier may also have different time lengths, which is not limited in this embodiment of the present disclosure.

In an uplink time of a component carrier, a network side device (for example, an AP) can schedule station to use each idle component carrier to send uplink service data to the network side device. In a downlink time of the component carrier, the network side device can schedule the network side device to use each idle component carrier to send downlink service data to each station.

The scheduling phase may be obtained through contention by the network side device in the downlink time of the component carrier, or may be obtained through contention by the network side device in the uplink time of the component carrier, and all phases or some phases of the scheduling phase may be released after the scheduling phase is obtained through contention successfully. The scheduling phase is also divided into an uplink scheduling phase and a downlink scheduling phase based on the uplink/downlink switching point, where data transmission in the uplink scheduling phase corresponds to an uplink transmission resource, data transmission in the downlink scheduling phase corresponds to a downlink transmission resource, and the uplink or downlink scheduling phase is a part or all of the uplink or downlink time of the component carrier.

The downlink transmission resource in the downlink scheduling phase is used by the network side device and the station to perform downlink transmission, and the uplink transmission resource in the uplink scheduling phase is used by the station and the network side device to perform uplink transmission.

The network side device determines, according to information about data transmission that is successfully obtained through contention for at least one component carrier, a start time and an end time of a scheduling phase corresponding to the at least one component carrier.

Embodiment 1

Figure 2:
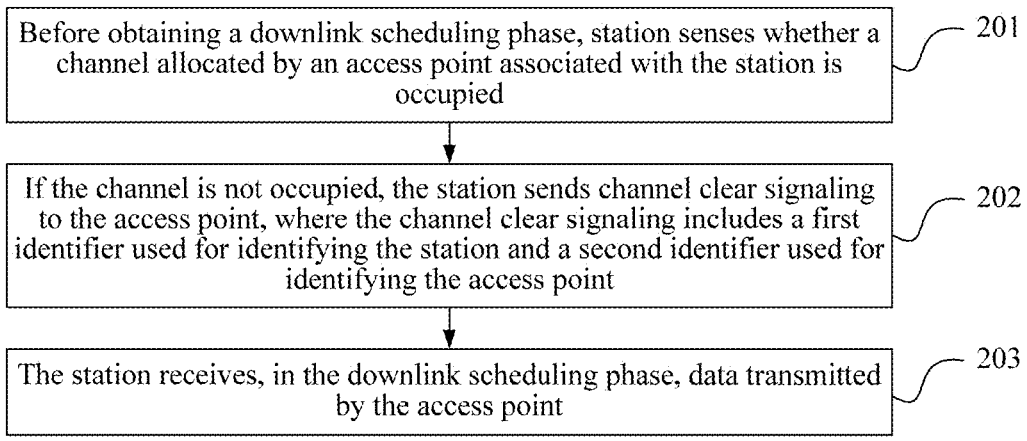
FIG. 2 is a schematic flowchart of an embodiment of a data transmission method according to the present disclosure.

FIG. 2 is a schematic flowchart of an embodiment of a data transmission method according to the present disclosure. The method may be used by an access point to transmit data to station by using a downlink scheduling phase. The method may be performed by the station for data transmission. As shown in FIG. 2, the method may include the following.

Step 201: Before obtaining a downlink scheduling phase, station senses whether a channel allocated by an access point associated with the station is occupied.

The station STA is a data receive end device during downlink transmission. Obtaining the scheduling phase refers to that for either the AP or the STA, a transmission time thereof is divided into an uplink transmission phase and a downlink transmission phase. In the uplink transmission phase, an uplink scheduling phase needs to be obtained between the AP and the STA, and the STA transmits uplink data to the AP. In the downlink transmission phase, the downlink scheduling phase needs to be obtained between the AP and the STA, and the AP transmits downlink data to the STA. In this embodiment, before the scheduling phase is obtained may generally refer to a time point around a switching time point of the uplink transmission phase and the downlink transmission phase.

In this embodiment, before obtaining the scheduling phase, the station needs to sense whether the channel allocated by the access point associated with the station is occupied, that is, the station needs to sense whether a channel of the station is available. For example, when the downlink scheduling phase in which the AP performs transmission to the STA, the STA senses whether a channel at a receive end of the STA is available. The access point associated with the station is an AP associated with the STA, which refers to that the STA establishes a connection to the associated AP, and can access a network by using the associated AP.

The method shown in FIG. 2 includes step 202: If the channel is not occupied, the station sends channel clear signaling to the access point, where the channel clear signaling includes a first identifier used for identifying the station and a second identifier used for identifying the access point.

In 201, if the station senses that a channel at a station end is available, that is, the channel is not occupied, the station sends the channel clear signaling (CCS for short) to a transmit end device. In this embodiment of the present disclosure, the transmit end device and a receive end device are described from the perspective of data transmission, the transmit end device sends data, and the receive end device receives data. As described above, data transmission may be that the AP transmits downlink data to the STA, and during downlink data transmission, the AP serves as a transmit end device of the current data transmission, and the STA serves as a receive end device, or, may be that the STA transmits uplink data to the AP, and during uplink data transmission, the STA serves as a transmit end device of the current data transmission, and the AP serves as the receive end device. The CCS includes the foregoing first identifier and second identifier, so that the access point starts data transmission when determining that the second identifier is an identifier corresponding to the access point. A function of the CCS is described by using an example as follows. For example, if an AP receives the CCS sent by the UE, the AP can view the second identifier. If the second identifier is an identifier of the AP, it indicates that the AP can occupy the channel, and for the AP, the channel is not occupied by another AP, and the AP can use the channel. If another AP receives the CCS and finds that the second identifier is not an identifier of the another AP, it indicates that the channel is an occupied channel, and the another AP cannot use the channel. Therefore, from the perspective of the UE, assuming that the UE receives scheduling information sent by a first AP, and the scheduling information is used for notifying the UE that the first AP needs to send downlink data to the UE, when sensing the channel, the UE senses whether the channel is occupied by an AP except the first AP, and if the channel is not occupied, the UE sends the CCS to the first AP. A function of the first identifier is that, when the AP determines, according to the second identifier, to start data transmission, the AP can find the UE according to the first identifier, and transmit data to the UE corresponding to the first identifier.

For example, FIG. 3 is a structural diagram 1 of CCS in an embodiment of a data transmission method according to the present disclosure. The CCS may include a clear to send frame (CTS for short) and a sequence frame. The CTS frame includes a Physical Layer Convergence Protocol (PLCP for short) header, frame control, duration (which is equivalent to an NAV, and the NAV is mainly used for limiting an occupation time of the channel), a reception address (RA for short), and a frame check sequence (FCS for short); and the sequence frame includes a PLCP Header and a sequence. The sequence in the sequence frame is used for indicating the first identifier corresponding to the station that sends the CCS, and the first identifier includes, for example, information about the STA. The RA in the CTS frame is used for indicating the second identifier corresponding to the access point that receives the CCS, and the second identifier includes, for example, information about the AP.

As shown in FIG. 3, a fixed time interval FT exists between the CTS frame and the sequence frame. Because the PLCP Header specifies a length of a physical protocol data unit (PPDU for short), and a legacy device needs to identify the CCS, the fixed time interval needs to be set between the CTS frame and the sequence frame to meet the foregoing two requirements. FIG. 3 shows an optional format of the CCS, where the CTS frame is before the sequence frame. The CCS may also be in a format shown in FIG. 4, that is, the sequence frame is before the CTS frame. FIG. 4 is a structural diagram of CCS in an embodiment of a data transmission method according to the present disclosure.

The method shown in FIG. 2 includes step 203: The station receives, in the downlink scheduling phase, data transmitted by the access point.

In 202, after the station sends the CCS to the access point, the access point views the second identifier in the CTS frame in the CCS to check whether the identifier is an identifier of the access point. If the identifier is the identifier of the access point, the access point AP obtains, according to the first identifier corresponding to the station in the sequence frame, the downlink scheduling phase of the station, and starts data transmission. If the second identifier in the CTS frame is not the identifier of the AP, the AP does not transmit data to the station in the downlink scheduling phase.

For example, using a current hidden node problem as an example, assuming that an AP1 transmits data to the STA, and an AP2 also wants to transmit data to the STA at this time, the AP2 sends downlink scheduling information to the STA, which is used for informing the STA that downlink transmission needs to be performed. In this case, the STA serves as a receive end device of the current downlink transmission, and detects whether the channel of the STA is available. However, the STA finds that the channel thereof is unavailable because the STA is communicating with the AP1, and the STA does not obtain a scheduling phase used for downlink transmission of the AP2 or send CCS to the AP2. For the AP2, the AP2 does not receive the CCS returned by the STA and does not transmit data to the STA either. Therefore, the hidden node problem is avoided, and the AP2 does not interfere with data transmission between the AP1 and the STA.

In addition, if the CCS sent by the STA is received by an AP, but the AP finds that an RA in a CTS frame in the CCS is not information used for identifying the device, it indicates that the CCS is not sent to the device, and the AP does not send, according to Duration in the CTS frame, data in a time corresponding to the Duration.

Further, when in the downlink scheduling phase, the receive end device is the STA, and the transmit end device is the AP, before the STA senses whether the channel of the STA is available, the STA receives downlink scheduling information and indication information used for identifying a sequence of the STA, where the downlink scheduling information and the indication information are sent by the AP. The STA determines, according to the downlink scheduling information, whether the STA is scheduled by the AP to perform downlink transmission. If the STA is scheduled by the AP to perform downlink transmission, the STA senses the channel of the STA, sends the CCS to the AP when the channel is available, and adds, to the CCS, the sequence of the STA that is allocated by the AP, as the first identifier.

Optionally, the indication information of the sequence of the station is received by the station in a process in which the station is associated with the access point, and the sequence of the station is a sequence allocated by the access point and corresponding to the station.

Optionally, the indication information of the sequence of the station may also be a sequence indication update message that is received from the access point by the station after the station is associated with the access point, and the sequence indication update message includes the indication information of the sequence of the station.

According to the data transmission method in this embodiment, a receive end device for data transmission senses a channel of the receive end device before performing transmission, and sends, only when the channel of the receive end device is available, channel clear signaling to instruct a transmit end device to start data transmission, so that a transmission collision can be prevented, and normal data transmission is ensured.

Embodiment 2

FIG. 5 is a schematic flowchart of another embodiment of a data transmission method according to the present disclosure. The method may be used by an access point to transmit data to station by using a downlink scheduling phase. The method may be performed by the access point for data transmission. The method is briefly described. For specific steps, reference may be made to the descriptions in Embodiment 1. As shown in FIG. 5, the method may include the following.

Step 501: An access point receives channel clear signaling sent by station, where the channel clear signaling includes a first identifier used for identifying the station and a second identifier used for indicating the access point.

The channel clear signaling is sent by the station when the station senses that a channel of the station is available. In addition, the access point indicated by the second identifier means that the channel of the station is already determined to be used for data transmission between the station and the access point indicated by the second identifier, only the access point indicated by the second identifier can obtain a scheduling phase and start to transmit data to the station in subsequent steps, and an access point that is not indicated by the second identifier cannot transmit data to the station.

The method shown in FIG. 5 includes step 502: When determining that the second identifier is an identifier corresponding to the access point, the access point transmits, by using a downlink scheduling phase, data to the station corresponding to the first identifier.

After receiving the CCS, the access point determines whether a second identifier corresponding to an RA in the CCS is an identifier corresponding to the access point or whether an RA includes information about the AP; and if the second identifier corresponding to the RA in the CCS is the identifier corresponding to the access point or if the RA includes the AP information of the access point, can determine that the CCS is sent by the STA to the access point, and the AP transmits data to the STA by using the downlink scheduling phase.

The method further includes sending, by the access point, downlink scheduling information, and indication information used for identifying a sequence of the station to the station, so that the station adds, to the channel clear signaling according to the indication information, the sequence of the station corresponding to the indication information, as the first identifier, that is, sets the sequence of the station at a position of a sequence in the CCS. This step may occur before the receiving, by an access point, channel clear signaling sent by station.

Optionally, the downlink scheduling information may be sent through contention by the access point in a downlink period.

Optionally, the access point may not contend, but send the downlink scheduling information after a downlink scheduling phase in a downlink period, or send the downlink scheduling information after sending the channel clear signaling to the station in a downlink period.

Figure 8:
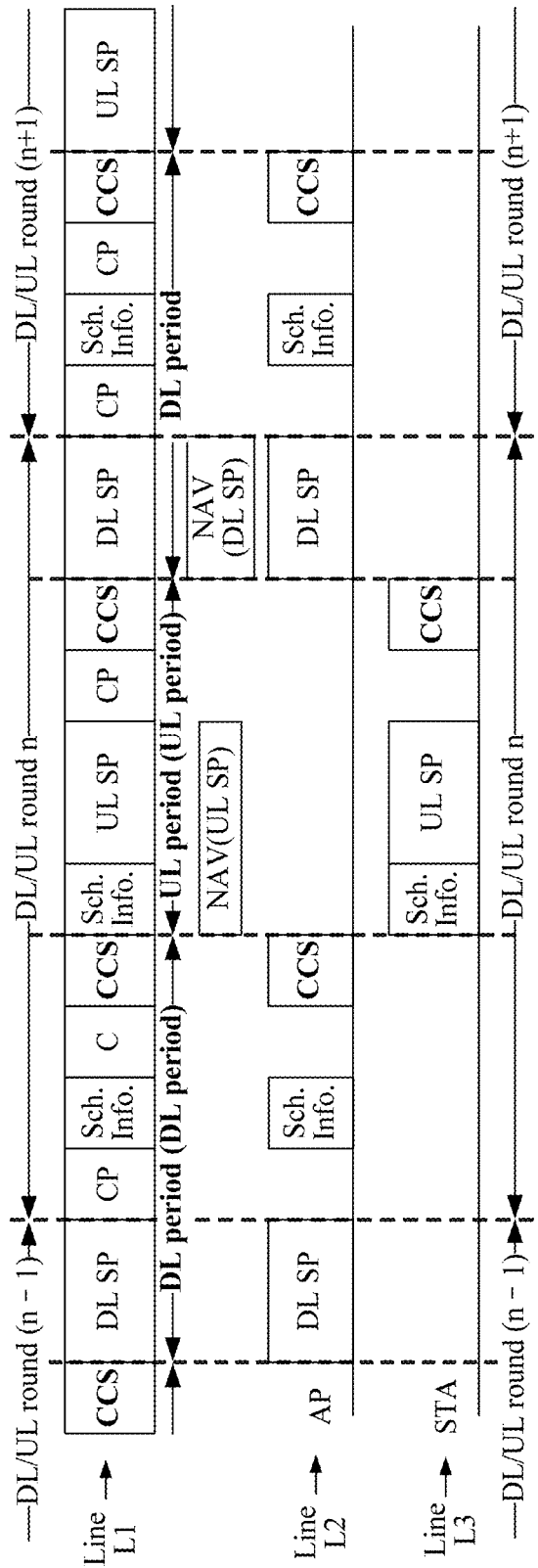
FIG. 8 is a schematic diagram of a transmission structure of still another embodiment of a data transmission method according to the present disclosure.

For the downlink period, reference may be made to FIG. 8 in a subsequent embodiment.

According to the data transmission method in this embodiment, a receive end device for data transmission senses a channel of the receive end device before performing transmission, and sends, only when the channel of the receive end device is available, channel clear signaling to instruct a transmit end device to start data transmission, so that a transmission collision can be prevented, and normal data transmission is ensured.

Embodiment 3

Figure 6:
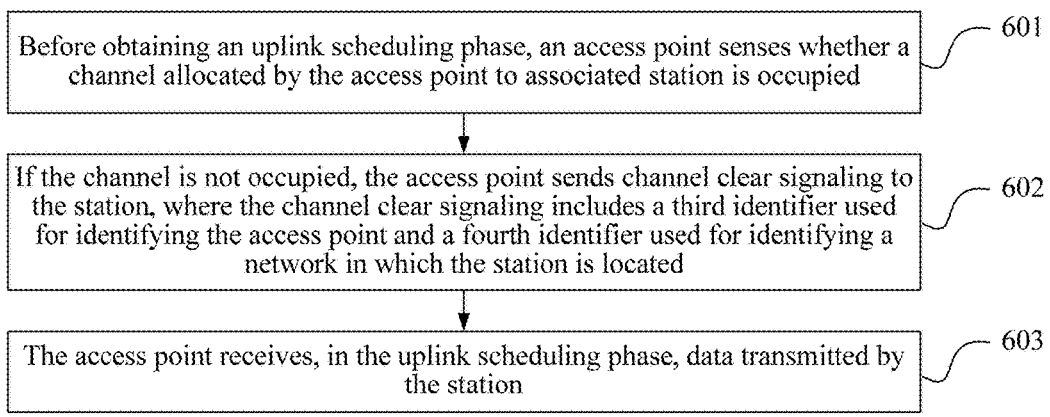
FIG. 6 is a schematic flowchart of still another embodiment of a data transmission method according to the present disclosure.

FIG. 6 is a schematic flowchart of still another embodiment of a data transmission method according to the present disclosure. The method may be used by station to transmit data to an access point by using an uplink scheduling phase. The method may be performed by the access point for data transmission. As shown in FIG. 6, the method may include the following.

Step 601: Before obtaining an uplink scheduling phase, an access point senses whether a channel allocated by the access point to associated station is occupied.

When a receive end device is the AP, a transmit end device is the STA, and an uplink scheduling phase in which the STA performs transmission to the AP needs to be obtained, the AP that serves as a receive end senses whether a channel of the AP is available. Further, before or after the sending, by the access point, channel clear signaling to the station, the method further includes sending, by the access point, uplink scheduling information to the station, where the uplink scheduling information is used for scheduling the station to perform uplink transmission.

Optionally, the uplink scheduling information may be sent through contention by the access point in a downlink period.

Optionally, the access point may not contend, but send the uplink scheduling information after a downlink scheduling phase in a downlink period, or send the downlink scheduling information after sending the channel clear signaling to the station in a downlink period.

The method shown in FIG. 6 includes step 602: If the channel is not occupied, the access point sends channel clear signaling to the station, where the channel clear signaling includes a third identifier used for identifying the access point and a fourth identifier used for identifying a network in which the station is located.

That the channel is not occupied may be that a channel between the AP and the STA that is to be scheduled by the AP to perform uplink transmission is available, that is, the AP is not performing data transmission with another STA. The channel clear signaling CCS is used for enabling the station to obtain, when determining that a network corresponding to the fourth identifier is a network in which the station is located, and an access point corresponding to the third identifier is the access point associated with the station, the uplink scheduling phase used for data transmission.

In addition, the network in which the station is located means that, assuming that three APs form a network W, and the station STA accesses the network W by using an AP in the three APs, the network W is the network in which the STA is located.

Further, the sending, by the access point, channel clear signaling to the station includes sending, by the access point, the channel clear signaling to the station, and adding, to the channel clear signaling, an access point sequence used for identifying the access point, as the third identifier.

In addition, in the CCS sent by the access point, when the CCS is broadcast to networks in which multiple STAs are located, an ID of a network in which a STA that receives the CCS is located may be set at a position of an RA; and the CCS further carries an identifier of an AP configured to send the CCS, which, for example, is a sequence used for identifying information about the AP.

The method shown in FIG. 6 includes step 603: The access point receives, in the uplink scheduling phase, data transmitted by the station.

For example, using a current exposed node problem as an example, when a STA1 transmits uplink data to an AP1, the AP1 sends uplink scheduling information to the STA1 to instruct the STA1 to perform uplink transmission, and the AP1 as a receive end device detects whether a channel of the receive end device is available, and if the channel is available, the AP1 sends CCS to the STA1. After the STA1 receives the CCS, if an identifier RA in a CTS frame in the CCS is an identifier of the STA1, the STA1 starts to obtain an uplink scheduling phase and transmit uplink data. In this case, the STA1 as a data transmit end device does not send an NAV, so that no interference is caused to a STA2 due to the NAV, and the exposed node problem is avoided.

According to the data transmission method in this embodiment, a receive end device for data transmission senses a channel of the receive end device before performing transmission, and sends, only when the channel of the receive end device is available, channel clear signaling to instruct a transmit end device to start data transmission, so that a transmission collision can be prevented, and normal data transmission is ensured.

Embodiment 4

Figure 7:
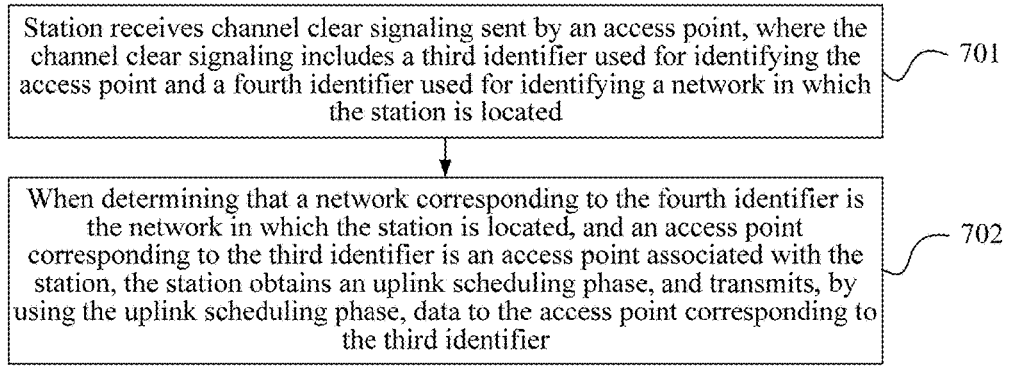
FIG. 7 is a schematic flowchart of still another embodiment of a data transmission method according to the present disclosure.

FIG. 7 is a schematic flowchart of still another embodiment of a data transmission method according to the present disclosure. The method may be used by station to transmit data to an access point by using an uplink scheduling phase. The method may be performed by the station for data transmission. As shown in FIG. 7, the method may include the following.

Step 701: Station receives channel clear signaling sent by an access point, where the channel clear signaling includes a third identifier used for identifying the access point and a fourth identifier used for identifying a network in which the station is located.

The channel clear signaling is sent by the access point when the access point senses that a channel of the access point is available, that is, is sent by the access point when the access point senses that a channel allocated by the access point to the associated station is not occupied.

The method shown in FIG. 7 includes step 702: When determining that a network corresponding to the fourth identifier is the network in which the station is located, and an access point corresponding to the third identifier is an access point associated with the station, the station obtains an uplink scheduling phase, and transmits, by using the uplink scheduling phase, data to the access point corresponding to the third identifier.

Optionally, the third identifier is indication information of a sequence of the access point, and the station may accordingly obtain the sequence of the access point, and determine whether the access point is an associated access point. The station may receive, in a process in which the station is associated with the access point, the indication information of the sequence of the access point that is sent by the access point, or, may receive, after the station is associated with the access point, a sequence indication update message sent by the access point, where the sequence indication update message includes the indication information of the sequence of the access point.

Further, before or after the receiving, by station, channel clear signaling sent by an access point, the method further includes: receiving, by the station, uplink scheduling information sent by the access point, and determining, according to the uplink scheduling information, that the station is scheduled by the access point to perform uplink transmission.

According to the data transmission method in this embodiment, a receive end device for data transmission senses a channel of the receive end device before performing transmission, and sends, only when the channel of the receive end device is available, channel clear signaling to instruct a transmit end device to start data transmission, so that a transmission collision can be prevented, and normal data transmission is ensured.

Processes of uplink data transmission and downlink data transmission are separately described in detail below by using two embodiments.

Embodiment 5

FIG. 8 is a schematic diagram 1 of a transmission structure of still another embodiment of a data transmission method according to the present disclosure. As shown in FIG. 8, a line corresponding to L1 is an overall transmission structure. A transmission time in the line L1 is divided into multiple phases, each phase is referred to as a downlink/uplink transmission round (DL/UL round). FIG. 8 shows several continuous DL/UL rounds: a DL/UL round (n−1), a DL/UL round (n), and a DL/UL round (n+1). Each downlink/uplink transmission round includes a time of an uplink scheduling phase (UL SP for short), used by a STA to transmit uplink data to an AP, and further includes a time of a downlink scheduling phase (DL SP for short), used by the AP to transmit downlink data to the STA. Before the uplink scheduling phase and the downlink scheduling phase, CCS is sent to instruct whether to obtain the scheduling phase. The line L1 may be split into a line L2 and a line L3, that is, the line L1 is formed by superimposing a transmission structure of the AP and a transmission structure of the STA.

Figure 9:
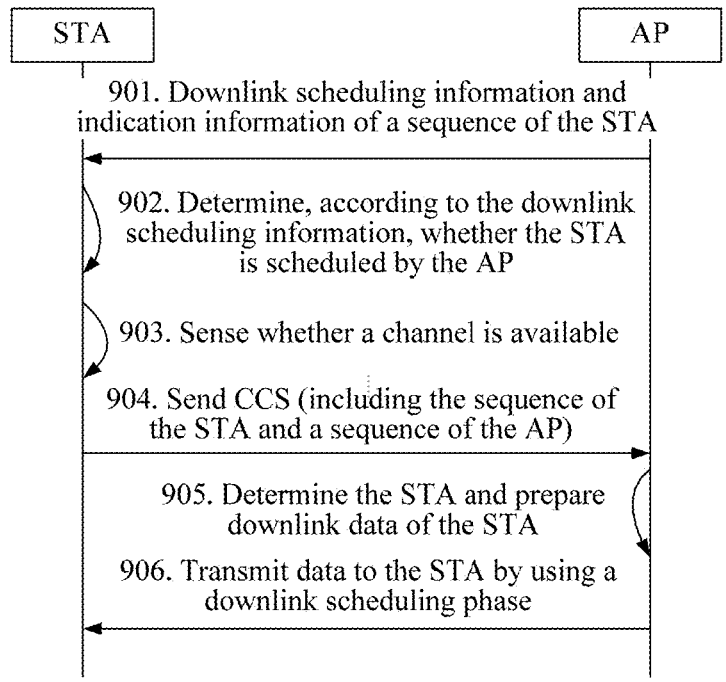
FIG. 9 is a schematic signaling diagram of still another embodiment of a data transmission method according to the present disclosure.

FIG. 9 is a schematic signaling diagram of still another embodiment of a data transmission method according to the present disclosure. FIG. 9 describes a process of obtaining a downlink scheduling phase. As shown in FIG. 9, the method may include the following.

Step 901: An AP sends downlink scheduling information, and indication information used for identifying a sequence of a STA to the STA.

The downlink scheduling information is used by the STA to determine whether the STA is scheduled by the AP. The indication information used for identifying the sequence of the STA is allocated by the AP to the STA, and the STA may accordingly obtain the sequence including information about the STA. The AP may allocate different sequences to different STAs. Optionally, the AP may send indication information of sequences of multiple STAs, and each STA searches for indication information corresponding to the STA.

The method shown in FIG. 9 includes step 902: The STA determines, according to the downlink scheduling information, whether the STA is scheduled by the AP.

If the STA determines, according to the downlink scheduling information, that the STA is not scheduled by the AP, the STA ends the procedure, and does not obtain a subsequent scheduling phase; if the STA is scheduled by the AP, the STA continues to perform step 903.

The method shown in FIG. 9 includes step 903: The STA senses whether a channel of the STA is available.

If the channel is unavailable, the STA ends the procedure, and does not obtain the subsequent scheduling phase. Otherwise, the STA continues to perform step 904.

The method shown in FIG. 9 includes step 904: The STA sends CCS to the AP, where the CCS includes a sequence of information about the AP and a sequence of information about the STA.

The sequence of the information about the AP may be acquired by the STA from the AP when the STA is associated with the AP, and the sequence of the information about the STA may be acquired from the AP in 901. With reference to FIG. 3, the sequence of the information about the AP is set at a position of an RA in a CTS frame in the CCS, and the sequence of the information about the STA is set at a position of a sequence in a sequence frame in the CCS.

With reference to FIG. 8, the CCS sent by the STA to the AP in this step may be CCS sent by STA in the line L3 in FIG. 8 before an uplink/downlink switching point.

The method shown in FIG. 9 includes step 905: The AP determines, according to the CCS, a STA that sends the CCS, and prepares downlink data of the STA.

For the transmit end device AP of the current downlink transmission, the AP may send, to each of multiple STAs, downlink scheduling information and a sequence indication in CCS corresponding to each STA in 901, and then some STAs may not return CCS to the AP because the STAs are busy in sensing a channel. In this step, the AP determines STAs that return CCS, if a STA returns the CCS and an RA field in the CCS is the sequence of the information about the AP, the AP may determine that a channel of the STA is idle, the STA can receive downlink data of the AP, and the AP can prepare downlink data of the STA.

In addition, if another AP also receives the CCS sent by the STA but finds that the RA field in the CCS is not a sequence that identifies the AP, the another AP may also determine that the STA is not prepared to receive downlink data of the another AP, and the another AP may not send, according to Duration in a CTS frame in the CCS, data in a time indicated by the Duration.

The method shown in FIG. 9 includes step 906: The AP transmits data to the STA by using a downlink scheduling phase.

With reference to FIG. 8, an AP in the line L2 transmits downlink data in a DL SP sent in the DL/UL round n. In addition, with reference to a corresponding NAV (DL SP) above the DL SP in FIG. 8, in this window time, there is no interference from another AP because as described in 905, even if another AP receives the CCS, the another AP does not send data in the Duration because the RA in the CTS frame is not an identifier corresponding to the another AP.

Embodiment 6

Figure 10:
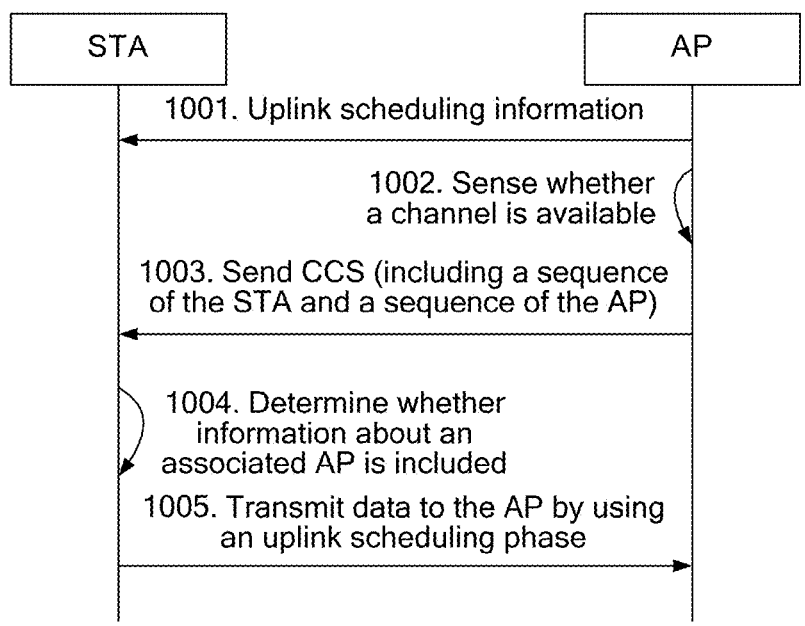
FIG. 10 is a schematic signaling diagram of still another embodiment of a data transmission method according to the present disclosure.

FIG. 10 is a schematic signaling diagram of still another embodiment of a data transmission method according to the present disclosure. FIG. 10 describes a process of obtaining an uplink scheduling phase. As shown in FIG. 10, the method may include the following.

Step 1001: An AP sends uplink scheduling information to a STA.

The uplink scheduling information is used for instructing the STA to perform uplink transmission. For example, with reference to FIG. 8, it may be scheduling information Sch Info sent in the DL/UL round n by the AP in the line L2 in FIG. 8.

The method shown in FIG. 10 includes step 1002: The AP senses whether a channel of the AP is available.

If the channel is unavailable, the AP ends the procedure, and does not obtain a subsequent scheduling phase; otherwise, the AP continues to perform step 1003.

The method shown in FIG. 10 includes step 1003: The AP sends CCS to the STA, where the CCS includes a sequence of information about the AP and a sequence of information about the STA.

With reference to FIG. 8, it may be CCS sent by the AP in the line L2 in FIG. 8 before an uplink/downlink switching point in the DL/UL round n.

The method shown in FIG. 10 includes step 1004: The STA determines, according to the CCS, whether information about an associated AP is included.

The STA acquires sequence information in the CCS of the AP when the STA is associated with the AP, and therefore, may determine whether it is CCS sent by the associated AP in this step, which is determining, according to a sequence in a sequence frame in the CCS, whether the sequence is the sequence information of the associated AP.

If it is not the sequence information of the associated AP, the STA ends the procedure, and does not obtain the subsequent scheduling phase; otherwise, the STA continues to perform step 1005.

The method shown in FIG. 10 includes step 1005: The STA transmits data to the AP by using an uplink scheduling phase.

With reference to FIG. 8, it may be that the STA in the line L3 in FIG. 8 performs uplink transmission in an uplink scheduling phase (UL SP) in an uplink period (UL period) in the DL/UL round n.

In addition, referring to the line L3 in FIG. 8, the STA immediately sends, after an uplink/downlink switching point in the uplink period, the scheduling information (Sch Info) that is received from the AP in a downlink period (DL period), and broadcasts the scheduling information to another station, that is, the Sch Info that is sent in the UL SP in the DL/UL round n in FIG. 8. The scheduling information is sent, so that another STA can learn a time that is occupied by the current uplink scheduling.

Figure 11:
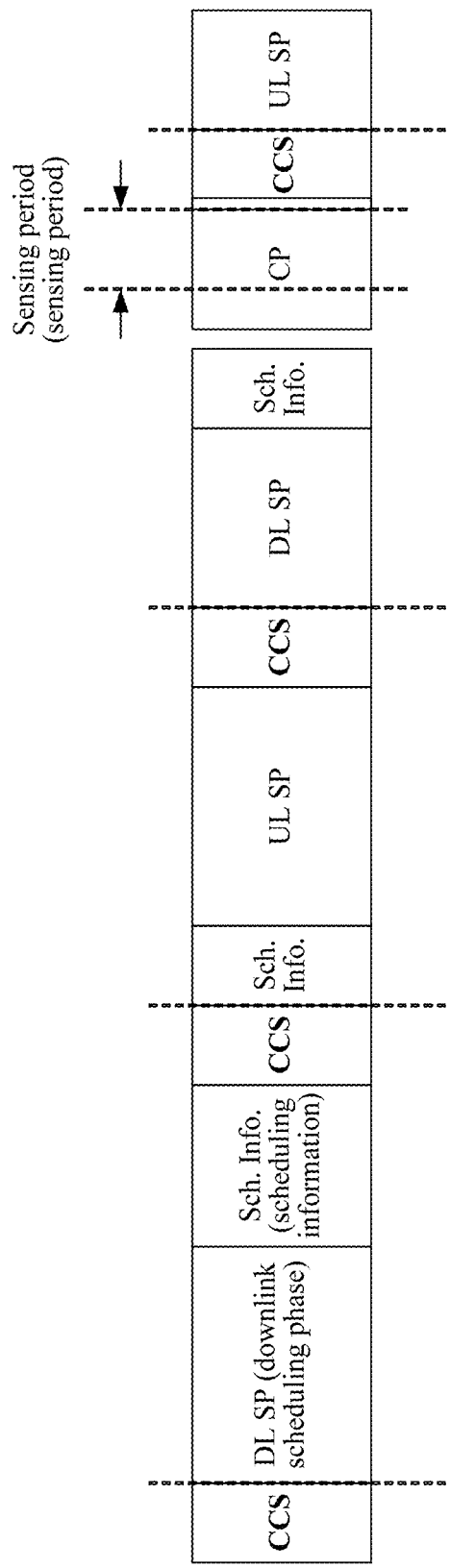
FIG. 11 is another schematic diagram of a transmission structure of still another embodiment of a data transmission method according to the present disclosure.

Optionally, FIG. 8 shows an optional transmission structure. In a specific implementation, another structural form may also be used. For example, FIG. 11 is a schematic diagram 2 of a transmission structure of still another embodiment of a data transmission method according to the present disclosure. When an uplink scheduling phase is obtained, an AP may reserve a specified time for CCS for sending immediately after a DL SP in a previous DL/UL round. When a downlink scheduling phase is obtained, the STA may reserve a specified time for the CCS for sending immediately after a UL SP in a current DL/UL round.

Figure 12:
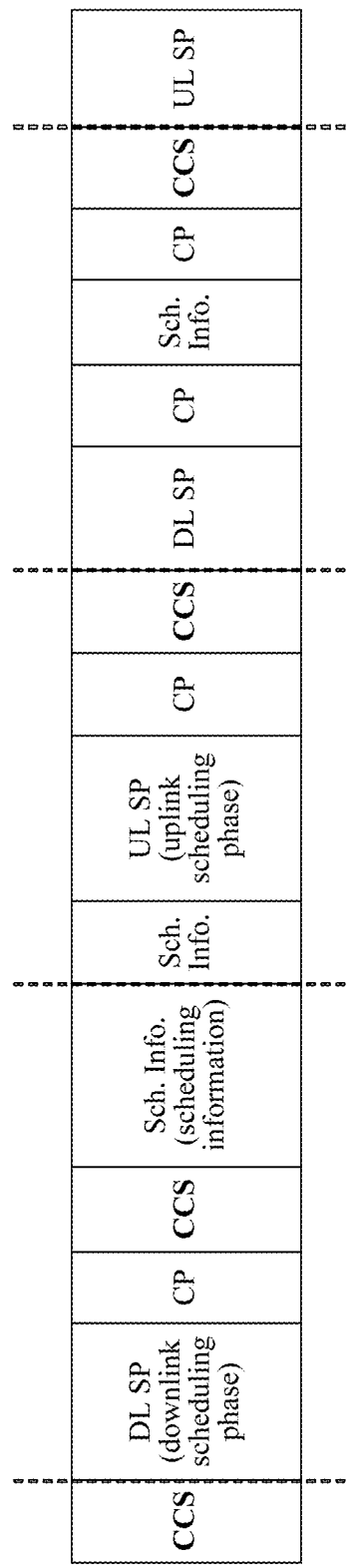
FIG. 12 is yet another schematic diagram of a transmission structure of still another embodiment of a data transmission method according to the present disclosure.

Optionally, FIG. 12 is a schematic diagram 3 of a transmission structure of still another embodiment of a data transmission method according to the present disclosure. The AP may first send CCS and then send scheduling information Sch Info, and does not need to contend. The scheduling information Sch Info only needs to be sent immediately after the CCS.

It should be noted that, for example, in the procedure in FIG. 10, the AP first sends the uplink scheduling information to the STA, and senses whether the channel of the AP is available. If the channel is unavailable, the AP ends the procedure, and does not obtain the subsequent scheduling phase. Otherwise, the AP sends the CCS to the STA. Therefore, in the procedure, the AP first sends the uplink scheduling information and then sends the CCS. Optionally, the AP may also first sense the channel, send the CCS to the STA when the channel of the AP is idle, and then, send the uplink scheduling information to the STA after the CCS. That is, an order of the CCS and the uplink scheduling information is optional. In addition, it may also be seen from FIG. 11 or FIG. 12, the CCS or the scheduling information may be continuous with the previous scheduling phase, it is unnecessary to contend to send the scheduling information, and the CCS is still sent in a specified time.

Embodiment 7

Figure 13:
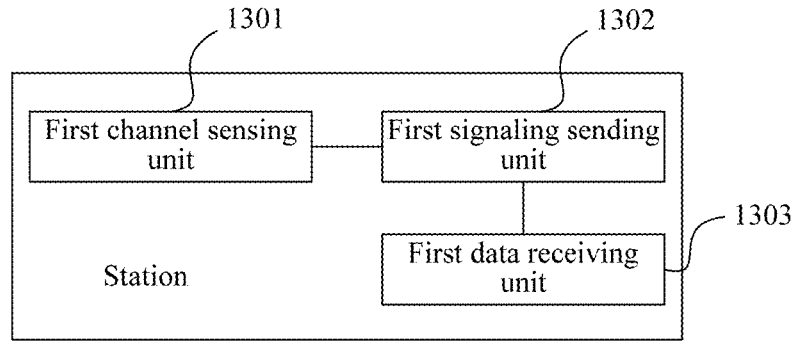
FIG. 13 is a schematic structural diagram of an embodiment of station according to the present disclosure.

FIG. 13 is a schematic structural diagram of an embodiment of station according to the present disclosure. As shown in FIG. 13, when the station serves as a receive end device of downlink data transmission, the device may include: a first channel sensing unit 1301, a first signaling sending unit 1302, and a first data receiving unit 1303.

The first channel sensing unit 1301 is configured to, before a downlink scheduling phase is obtained, sense whether a channel allocated by an access point associated with the station is occupied.

The first signaling sending unit 1302 is configured to, in response to the channel not being occupied, send channel clear signaling to the access point, where the channel clear signaling includes a first identifier used for identifying the station and a second identifier used for identifying the access point, so that after determining that the second identifier is an identifier corresponding to the access point, the access point obtains the downlink scheduling phase used for data transmission.

The first data receiving unit 1303 is configured to receive, in the downlink scheduling phase, data transmitted by the access point.

Figure 14:
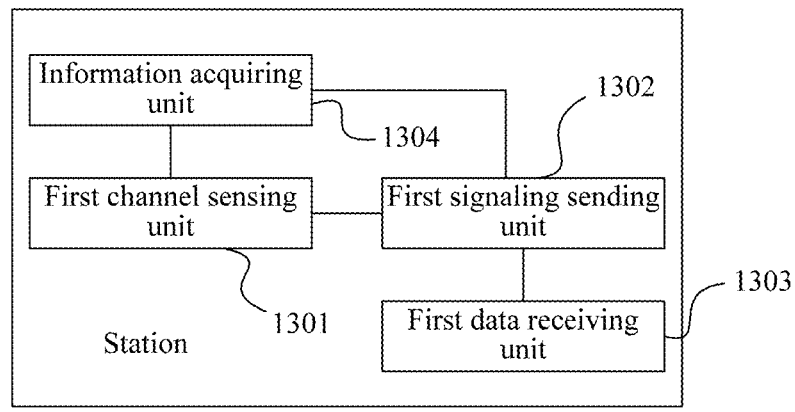
FIG. 14 is a schematic structural diagram of another embodiment of station according to the present disclosure.

FIG. 14 is a schematic structural diagram of another embodiment of station according to the present disclosure. Based on the structure in FIG. 13, the device may further include an information acquiring unit 1304.

The information acquiring unit 1304 is configured to, before the first channel sensing unit 1301 senses whether the channel is occupied, receive downlink scheduling information, and indication information used for identifying a sequence of the station, where the downlink scheduling information and the indication information are sent by the access point; and determine, according to the downlink scheduling information, that the station is scheduled by the access point to perform downlink transmission.

The first signaling sending unit 1302 is configured to, in response to sending the channel clear signaling, send the channel clear signaling to the access point, and add, according to the indication information, the sequence of the station that is acquired according to the indication information, as the first identifier.

Further, the information acquiring unit 1304 is configured to, in response to receiving the indication information, receive, in a process in which the station is associated with the access point, the sequence of the station, where the sequence of the station is a sequence allocated by the access point and corresponding to the station; or, receive, after the station is associated with the access point, a sequence indication update message sent by the access point, where the sequence indication update message includes the indication information of the sequence of the station.

Embodiment 8

Figure 15:
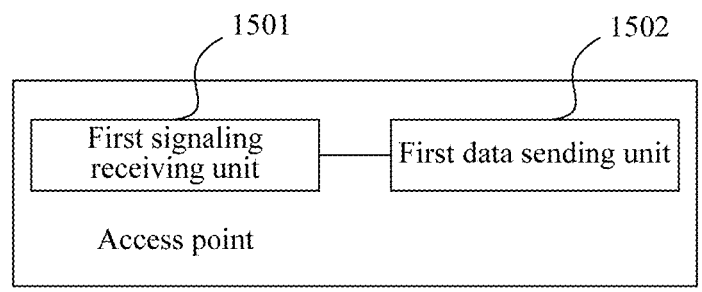
FIG. 15 is a schematic structural diagram of an embodiment of an access point according to the present disclosure.

FIG. 15 is a schematic structural diagram of an embodiment of an access point according to the present disclosure. As shown in FIG. 15, when the access point serves as a transmit end device of downlink data transmission, the device may include: a first signaling receiving unit 1501 and a first data sending unit 1502.

The first signaling receiving unit 1501 is configured to receive channel clear signaling sent by station, where the channel clear signaling includes a first identifier used for identifying the station and a second identifier used for indicating the access point, and the channel clear signaling is sent by the station when the station senses that a channel allocated by the access point associated with the station is not occupied.

The first data sending unit 1502 is configured to, in response to a determination that the second identifier is an identifier corresponding to the access point, transmit, by using a downlink scheduling phase, data to the station corresponding to the first identifier.

Figure 16:
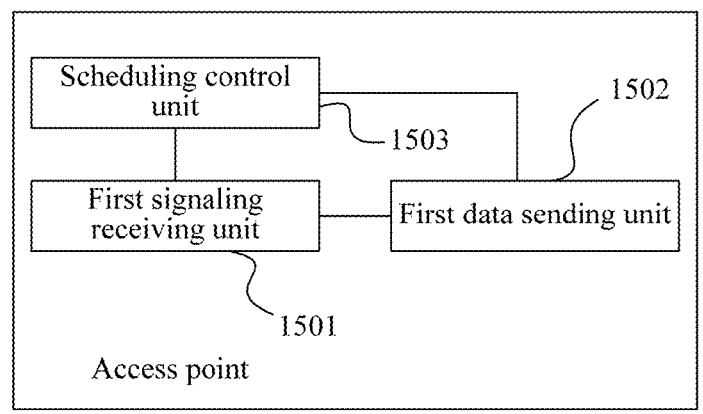
FIG. 16 is a schematic structural diagram of another embodiment of an access point according to the present disclosure.

FIG. 16 is a schematic structural diagram of another embodiment of an access point according to the present disclosure. Based on the structure in FIG. 15, the device may further include a scheduling control unit 1503.

The scheduling control unit 1503 is configured to, before the first signaling receiving unit receives the channel clear signaling sent by the station, send downlink scheduling information, and indication information used for identifying a sequence of the station to the station, so that the station adds, to the channel clear signaling according to the indication information, the sequence of the station corresponding to the indication information, as the first identifier.

Further, the scheduling control unit 1503 is configured to, in response to sending the downlink scheduling information to the station, contend to send the downlink scheduling information in a downlink period; or, send the downlink scheduling information after a downlink scheduling phase in a downlink period; or, send the downlink scheduling information after the channel clear signaling is sent to the station in a downlink period.

Embodiment 9

Figure 17:
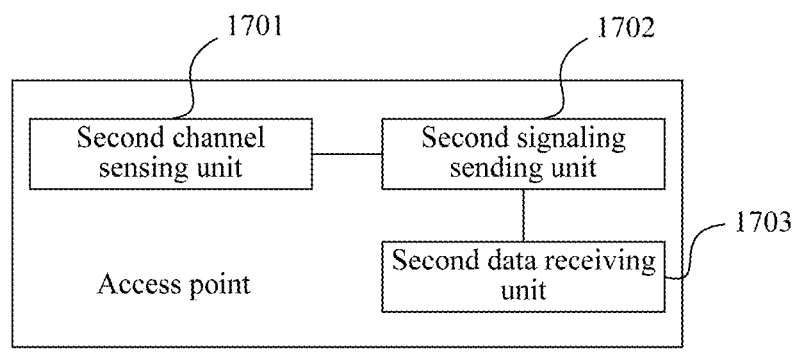
FIG. 17 is a schematic structural diagram of still another embodiment of an access point according to the present disclosure.

FIG. 17 is a schematic structural diagram of still another embodiment of an access point according to the present disclosure. As shown in FIG. 17, when the access point serves as a receive end device of uplink data transmission, the device may include a second channel sensing unit 1701, a second signaling sending unit 1702, and a second data receiving unit 1703.

The second channel sensing unit 1701 is configured to, before an uplink scheduling phase is obtained, sense whether a channel allocated by the access point to associated station is occupied.

The second signaling sending unit 1702 is configured to, in response to the channel not being occupied, send channel clear signaling to the station, where the channel clear signaling includes a third identifier used for identifying the access point and a fourth identifier used for identifying a network in which the station is located, so that when determining that a network corresponding to the fourth identifier is the network in which the station is located, and an access point corresponding to the third identifier is the access point associated with the station, the station obtains the uplink scheduling phase used for data transmission.

The second data receiving unit 1703 is configured to receive, in the uplink scheduling phase, data transmitted by the station.

Figure 18:
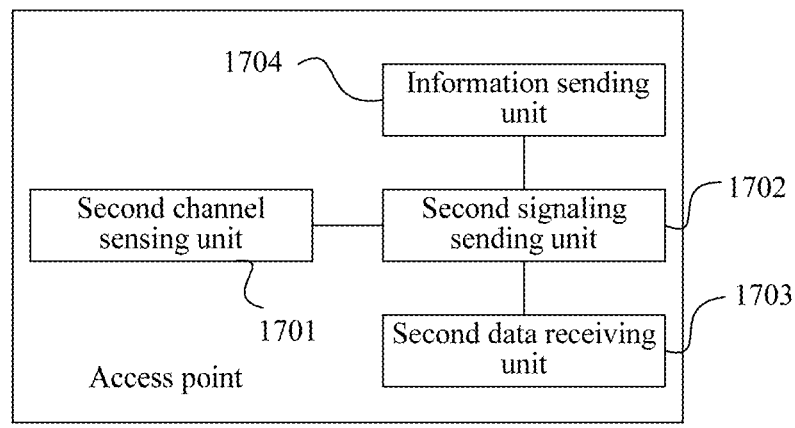
FIG. 18 is a schematic structural diagram of yet another embodiment of an access point according to the present disclosure.

FIG. 18 is a schematic structural diagram of yet another embodiment of an access point according to the present disclosure. Based on the structure shown in FIG. 17, the device may further include an information sending unit 1704.

The information sending unit 1704 is configured to, before or after the second signaling sending unit 1702 sends the channel clear signaling, send uplink scheduling information to the station, where the uplink scheduling information is used for scheduling the station to perform uplink transmission.

The second signaling sending unit 1702 is configured to, in response to sending the channel clear signaling to the station, add, to the channel clear signaling, an access point sequence used for identifying the access point, as the third identifier.

Further, the information sending unit 1704 is configured to, in response to sending the uplink scheduling information to the station, contend to send the uplink scheduling information in a downlink period; or, send the uplink scheduling information after a downlink scheduling phase in a downlink period; or, send the uplink scheduling information after the channel clear signaling is sent to the station in a downlink period.

Embodiment 10

Figure 19:
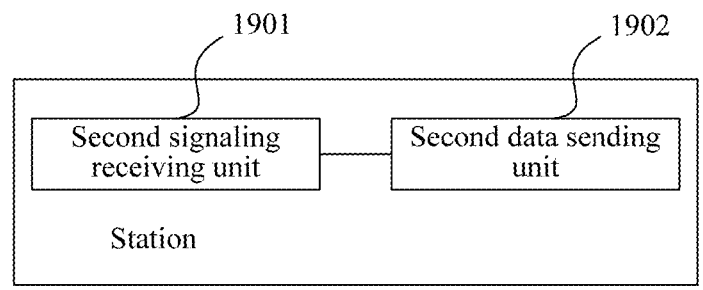
FIG. 19 is a schematic structural diagram of still another embodiment of station according to the present disclosure.

FIG. 19 is a schematic structural diagram of still another embodiment of station according to the present disclosure.

As shown in FIG. 19, when the station serves as a transmit end device of uplink data transmission, the device may include a second signaling receiving unit 1901 and a second data sending unit 1902.

The second signaling receiving unit 1901 is configured to receive channel clear signaling sent by an access point, where the channel clear signaling includes a third identifier used for identifying the access point and a fourth identifier used for identifying a network in which the station is located, and the channel clear signaling is sent by the access point when the access point senses that a channel allocated by the access point to the associated station is not occupied.

The second data sending unit 1902 is configured to, in response to a determination that a network corresponding to the fourth identifier is the network in which the station is located, and an access point corresponding to the third identifier is the access point associated with the station, obtain an uplink scheduling phase, and transmit, by using the uplink scheduling phase, data to the access point corresponding to the third identifier.

Further, the second signaling receiving unit 1901 is further configured to, before or after the station receives the channel clear signaling sent by the access point, receive uplink scheduling information sent by the access point, and determine, according to the uplink scheduling information, that the station is scheduled by the access point to perform uplink transmission.

Further, the second signaling receiving unit 1901 is configured to, in response to receiving the uplink scheduling information sent by the access point, receive, in a process in which the station is associated with the access point, indication information of a sequence of the access point that is sent by the access point; or, receive, after the station is associated with the access point, a sequence indication update message sent by the access point, where the sequence indication update message includes indication information of a sequence of the access point.

Further, the second data sending unit 1902 is further configured to broadcast the uplink scheduling information received by the second signaling receiving unit to another station after an uplink/downlink switching point in an uplink period.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present disclosure, rather than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present disclosure.

What is claimed is:

1. A data transmission method, comprising:
   receiving, by a station from an access point, downlink scheduling information and indication information identifying a sequence of the station;
   determining, according to the downlink scheduling information, that the station is scheduled by the access point to perform downlink transmission;
   before obtaining a downlink scheduling phase, sensing, by the station, whether a channel allocated by the access point associated with the station is occupied;
   in response to sensing by the station that the channel is not occupied, sending, by the station, a channel clear signaling to the access point, wherein the channel clear signaling comprises a first identifier identifying the station, and a second identifier identifying the access point, wherein the first identifier comprises the sequence of the station, wherein the sequence of the station is allocated by the access point;
   receiving, by the station in the downlink scheduling phase used for data transmission, data transmitted by the access point, the downlink scheduling phase obtained by the access point after the access point determines that the second identifier corresponds to the access point; and
   receiving, by the station from the access point, after the station is associated with the access point, a sequence indication update message comprising indication information of an updated sequence of the station.

2. The method according to claim 1, wherein the indication information of the sequence of the station is received by the station in a process in which the station is associated with the access point.

3. The method according to claim 1, wherein the channel clear signaling comprises a clear to send frame and a sequence frame, wherein the clear to send frame comprises the second identifier and a network allocation vector, and wherein the sequence frame comprises the first identifier.

4. A data transmission method, comprising:
   sending, to a station by a first access point of a plurality of access points, downlink scheduling information and indication information identifying a sequence of the station, causing the station to add to a channel clear signaling, according to the indication information, the sequence of the station corresponding to the indication information, as a first identifier;
   receiving, by the first access point, the channel clear signaling sent by the station, wherein the channel clear signaling comprises the first identifier and a second identifier, the first identifier identifying the station and the second identifier identifying the first access point, wherein the first identifier comprises the sequence of the station, wherein the sequence of the station is allocated by the first access point, wherein the channel clear signaling is sent by the station in response to the station sensing that a channel allocated by the first access point associated with the station is not occupied by a transmission from any access point of the plurality of access points;
   in response to determining that the second identifier corresponds to the first access point, determining that the channel allocated by the first access point is not occupied by a transmission from any access point of the plurality of access points and is available for the first access point to use to transmit data to the station, and transmitting, by the first access point using a downlink scheduling phase, data to the station corresponding to the first identifier; and sending, by the first access point to the station, after the station is associated with the first access point, a sequence indication update message comprising indication information of an updated sequence of the station.

5. The method according to claim 4, wherein the first access point contends to send the downlink scheduling information in a downlink period.

6. The method according to claim 4, wherein the first access point sends the downlink scheduling information after a downlink scheduling phase in a downlink period.

7. The method according to claim 4, wherein the first access point sends the downlink scheduling information in a downlink period after sending the channel clear signaling to the station.

8. A station, comprising:
a processor; and
a computer-readable storage medium storing a program to be executed by the processor, the program comprising instructions for:
receiving, from a first access point, downlink scheduling information and indication information identifying a sequence of the station, before sensing whether a channel is occupied;
determining, according to the downlink scheduling information, that the station is scheduled by the first access point to perform downlink transmission;
sensing whether the channel allocated by the first access point associated with the station is occupied, before a downlink scheduling phase is obtained, wherein the station is configured to communicate with a plurality of access points including the first access point, and sensing whether the channel is occupied comprises sensing whether the channel is occupied by a transmission to the station from any access point of the plurality of access points;
sending channel clear signaling to the first access point, in response to sensing that the channel is not occupied, wherein the channel clear signaling comprises a first identifier identifying the station and a second identifier identifying the first access point, wherein the first identifier comprises the sequence of the station, wherein the sequence of the station is allocated by the first access point, wherein the channel clear signaling indicates to the first access point that the channel allocated by the first access point is not occupied by a transmission from any access point and is available for the first access point to use to transmit data to the station, and wherein after determining that the second identifier corresponds to the first access point, the first access point obtains the downlink scheduling phase used for data transmission;
receiving, in the downlink scheduling phase, data transmitted by the first access point; and
receiving, after the station is associated with the first access point, a sequence indication update message sent by the first access point, wherein the sequence indication update message comprises the indication information of the sequence of the station.

9. The station according to claim 8, wherein the program further comprises instructions for:
in response to sensing the channel is not occupied, send the channel clear signaling to the first access point, and add, according to the indication information, the sequence of the station that is acquired according to the indication information, as the first identifier.

10. The station according to claim 9, wherein the program further comprises instructions for receiving, in a process in which the station is associated with the first access point, the sequence of the station, in response to receiving the indication information, wherein the sequence of the station is a sequence allocated by the first access point and corresponding to the station.

11. The station according to claim 8, wherein the channel clear signaling comprises a clear to send frame and a sequence frame, wherein the clear to send frame comprises the second identifier and a network allocation vector, and wherein the sequence frame comprises the first identifier.

12. An access point, comprising:
a processor; and
a computer-readable storage medium storing a program to be executed by the processor, the program comprising instructions for:
sending, before receiving channel clear signaling sent by a station, downlink scheduling information, and indication information identifying a sequence of the station to the station, wherein the station adds, to the channel clear signaling according to the indication information, the sequence of the station corresponding to the indication information, as a first identifier;
receiving the channel clear signaling sent by the station, wherein the channel clear signaling comprises the first identifier identifying the station and a second identifier identifying the access point, wherein the first identifier comprises the sequence of the station, wherein the sequence of the station is allocated by the access point, and wherein the channel clear signaling is sent by the station in response to the station sensing that a channel allocated by the access point associated with the station is not occupied;
transmitting, using a downlink scheduling phase, data to the station corresponding to the first identifier, in response to a determination that the second identifier corresponds to the access point; and
sending, to the station, after the station is associated with the access point, a sequence indication update message comprising indication information of an updated sequence of the station.

13. The access point according to claim 12, wherein the program further includes instructions for contending to send the downlink scheduling information in a downlink period, in response to sending the downlink scheduling information to the station.

14. The access point according to claim 12, wherein the program further includes instructions for sending the downlink scheduling information after a downlink scheduling phase in a downlink period.

15. The access point according to claim 12, wherein the program further includes instructions for sending the downlink scheduling information after the channel clear signaling is sent to the station in a downlink period.

* * * * *